Feb. 24, 1970   J. TRA ET AL   3,497,060
SEPARATOR FOR FIBER SUSPENSION
Filed Feb. 20, 1969
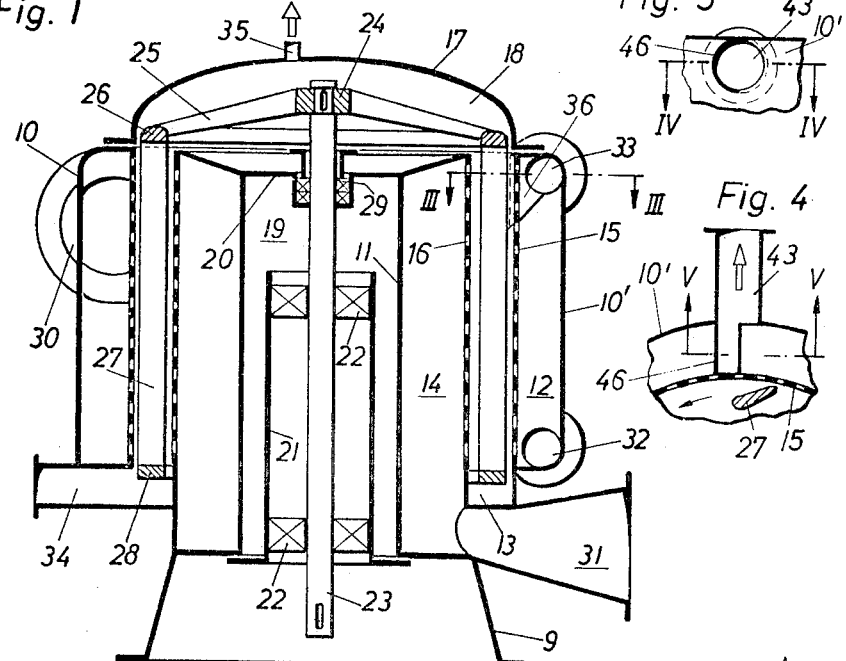
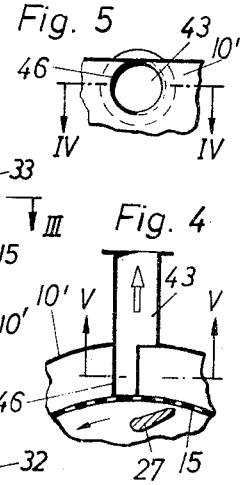
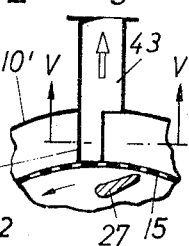
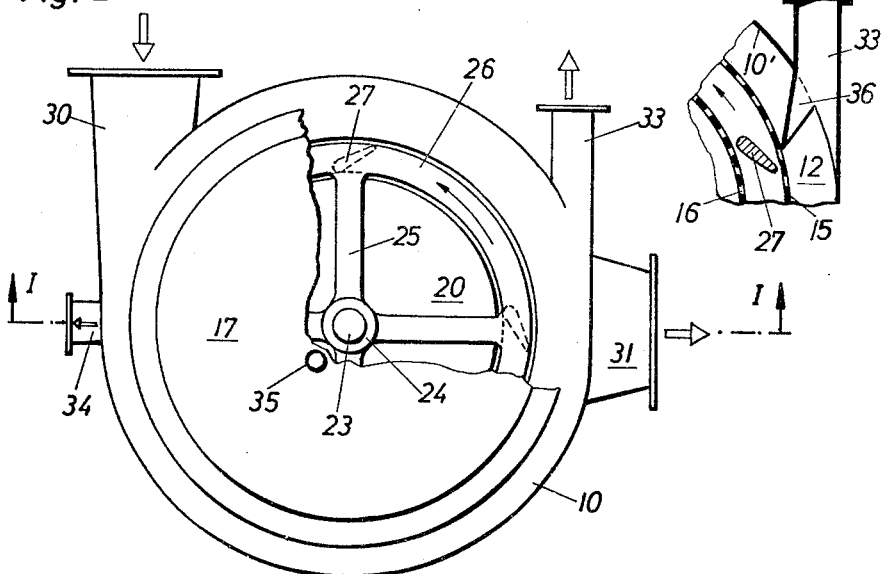
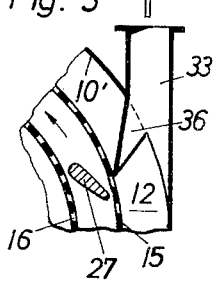
INVENTOR.
JOSEF TRA
BY JOSEF SCHERZ

United States Patent Office 3,497,060
Patented Feb. 24, 1970

3,497,060
SEPARATOR FOR FIBER SUSPENSION
Josef Tra and Josef Scherz, Heidenheim, Germany, assignors to J. M. Voith G.m.b.H., Heidenheim (Brenz), Germany
Filed Feb. 20, 1969, Ser. No. 801,000
Claims priority, application Germany, Feb. 22, 1968, 1,583,936
Int. Cl. B07b 1/50, 1/20, 1/04
U.S. Cl. 209—273    10 Claims

ABSTRACT OF THE DISCLOSURE

The invention pertains to a screening device for screening fiber suspensions and consists of a closed cylindrical housing arranged on a vertical axis and having concentrically arranged therein at least one sieve or screen. An inlet chamber for suspension to be screened surrounds the sieve and the suspension is introduced tangentially into the inlet chamber so as to flow circularly therein. In the upper portion of the inlet chamber is a rejects outlet connection for lightweight impurities with the outlet connection preferably arranged tangentially in the direction of circular flow of the suspension. A guiding wall may be provided on the downstream side of the connection in the inlet chamber to guide the lightweight material into the rejects outlet connection.

---

The present invention relates to a screening device for fibrous suspensions, particularly suspensions of fibers and water, and especially such suspensions in the form of paper stock prepared from waste paper.

Waste paper has long been used for the manufacture of new paper but formerly was subjected to a preliminary classification, or sorting, by hand. Such hand sorting is now too expensive and the stock made from waste paper thus arrives at the screens without any preliminary sorting so that a great many impurities are present in the stock. The problem of impurities in the paper stock is intensified because waste paper which is presently encountered carries a considerable amount of impurities, particularly in view of present day rather sophisticated packaging and wrapping procedures.

The waste paper might contain, for example, particles of metal or long fibers such as glass fibers, plastic materials, including solid and foam plastics and plastic in strip form and other substances, none of which is it desired to get into the paper web being made. For this reason of the great variety of foreign material in waste paper, and because hand sorting is impractical, improved cleaning of the paper stock before it reaches the paper making machine is necessary.

Screening devices are known which operate with the exclusion of air and under pressure but such devices have not heretofore been adequate for the purpose of adequately screening the paper stock, or suspension, at the high speed required for modern paper making machinery. In particular, screening devices of the prior art have been defective in respect of processing suspensions made from waste paper while maintaining a high rate of through put.

A known screening device of the general type known in the prior art comprises a cylindrical housing arranged with its axis vertical and having a cylindrical sieve or screen concentrically disposed therein and stationary within the housing. The paper stock is supplied to the outside of the sieve or screen and flows radially inwardly therethrough with the foreign bodies or material being retained on the outside of the sieve. Cleaning elements run along the inside of the screen and develop a radially outwardly directed hydrodynamic pressure on the inner surface of the screen which acts through the apertures therein to dislodge the solid material which collects on the outside of the screen so that this material can be removed from the screen or sieve.

Clean suspension is withdrawn from the inside of the sieve and the foreign materials dislodged from the outside of the sieve are removed from this region at the bottom of the separator. The solid material is generally heavier than the paper stock and migrates downwardly in the region surrounding the sieve and can thus be withdrawn from the lower portion of the region surrounding the sieve.

In another known type screening device, there are provided two concentrically arranged screens or sieves within the housing with a clean suspension outlet leading from inside the inner screen and with an outlet at the bottom of the annular chamber between the screens or sieves for the removal of coarse fibers and any other foreign material which is stopped by the second sieve. Both sieves in such an arrangement are usually adapted for being cleaned by scrapers or by rotating blades which may develop an hydrodynamic action thereon opposite to the direction of stock flow as referred to above.

With known screening devices, including the two types generally referred to above, it has been discovered that impurities screened out from the suspension which have a low specific gravity will migrate toward the top of the screens and tend to accumulate and to build up on the sieve from the top toward the bottom and will result in reduced capacity of the separator, or cleaner. The problem of the lighter foreign matter has increased in severity in recent times due to, at least in part, the use of such materials as plastic foams such as polystyrene and polyurethane foams which are often employed in packaging procedures.

The present invention proposes to solve the problem of efficiently screening suspensions of the nature referred to while maintaining the screening device at high capacity, or high through put.

The present invention also proposes the provision of a screening device for fibrous suspensions in which foreign material of high specific gravity, as well as that of low specific gravity can efficiently be removed from the suspension being cleaned and discharged from the device to prevent accumulation thereof in the device with a subsequent reduction in capacity thereof.

The nature of the present invention and the objectives and advantages thereof will become more apparent upon reference to the following detailed specification taken in connection with the accompanying drawings in which:

FIGURE 1 is a vertical sectional view showing a screening device according to the present invention and is indicated by line I—I on FIGURE 2;

FIGURE 2 is a plan view of the device of FIGURE 1 with a portion of the lid or cover of the separator broken away to show the internal construction thereof;

FIGURE 3 is a horizontal sectional view through the rejects outlet connection for lightweight impurities from the device and is indicated by line III—III on FIGUE 1;

FIGURE 4 is a view similar to FIGURE 3 but shows a modification of the rejects outlet connection for lightweight impurities and is indicated by line IV—IV on FIGURE 5; and FIGURE 5 is a vertical sectional view indicated by line V—V on FIGURE 4.

Summary of the invention

The present invention solves the problem of the efficient removal of both lightweight and heavyweight impurities and foreign particles from paper stock, especially from paper stock made from waste papers, by providing a screening device consisting of a closed cylindrical housing arranged on a vertical axis and having one or two sieves or screens concentrically arranged therein. The stock to be screened is introduced into an annular chamber surrounding the outer sieve and, preferably, in a tangential direction. This same annular chamber has a first rejects outlet connection at the top for light foreign material and a second rejects outlet connection at the bottom for heavy foreign material, the said outlets preferably discharging from the annular space in a tangential direction and being circumferentially spaced from the aforementioned inlet for the stock.

The device includes cleaning elements in the form of blades or wings which rotate in the separator so as to move along a path inside the outer sieve and develop an hydrodynamic pressure thereon directed radially outwardly and operable to dislodge accumulated foreign material from the outside of the outer sieve.

Due to the provision of the upper outlet from the annular chamber surrounding the outer sieve, the impurities separated from the paper stock which rise into the upper portion of the inlet chamber surrounding the outer sieve can be withdrawn from this chamber and conveyed away from the device and will not accumulate on the sieve and interfere with the flow of stock therethrough. The sieve is thus maintained at full capacity even though the stock might contain a relatively high percentage of lightweight foreign material. A high rate of flow of paper stock through the device can thus be maintained even if the stock contains impurities in the form of plastic foam or wood slivers or other lightweight particles of this nature.

As indicated above the stock to be cleaned is introduced into the inlet chamber, preferably, in a tangential direction, whereby the stock moves circumferentially in the chamber before passing the sieves. Thus, centrifugal forces push the heavy foreign material, e.g. particles of metal or sand, outwardly to the wall of the inlet chamber, along which they migrate downwardly. These heavy particles are therefore separated without coming into contact with the sieves, which are, thus, less worn than would otherwise be the case.

On the other hand, by the circumferential movement in the inlet chamber of the stock to be cleaned, the lightweight impurities are pushed inwardly against the outer surface of the outer sieve, along which they rise into the upper portion of the inlet chamber; thus, they tend to clog the upper portion of the outer sieve.

Therefore, the present invention also provides a guiding wall in the inlet chamber on the downstream side of the upper discharge outlet with respect to the circumferential movement of the stock so that the lightweight impurities rising along the outer surface of the outer sieve to the upper portion of the inlet chamber are guided away from the sieve and into the upper rejects outlet connection and are expelled from the screening device. Thus, the generally circular motion of the paper stock in the inlet chamber, due to the tangential directed inlet in the chamber, also facilitates, in co-operation with said guiding wall, the discharge of the lightweight foreign material through the upper discharge, or rejects, outlet.

The guiding wall referred to preferably extends from the outer surface of the outer screen to the wall of the inlet chamber and may, furthermore, be inclined angularly to the screen to facilitate guiding of the lightweight impurities into the upper discharge outlet. Thus the lightweight impurities are removed more rapidly from the region of the sieve, so that the sieve is prevented from being obstructed in the upper region thereof and a high rate of flow through the separator, or screening device, can be maintained.

Detailed description

Referring to the drawings somewhat more in detail, the screening device illustrated in FIGURES 1, 2, and 3 comprises a cylindrical housing 10 arranged with its axis vertical and supported on a base or foundation member 9. Coaxially arranged within housing 10 is a first cylindrical sieve member 15 which, together with the cylindrical wall portion 10′ of the housing, forms an annual inlet chamber 12 to which the stock to be purified is supplied. The stock inlet is in the form of an inlet conduit 30 preferably opening into chamber 12 in a tangential direction and may be located near the top of chamber 12. Coaxially arranged inside sieve 15 is a second sieve 1 and communicating with the space 14 inside sieve 16 is an outlet 31 for the stock, or suspension, that has passed through sieves 15 and 16 arranged in series and which stock is, therefore, purified or cleaned. The sieves 15 and 16 define an annular space 13 therebetween.

The housing 10 is closed at the top by a cover member 17 and is also closed at the bottom by the horizontal wall at the top of base portion 9. The said horizontal wall is centrally apertured and extending upwardly therefrom is a sleeve portion 11 and at the upper end of sleeve portion 11 is an upper wall 20 extending radially inwardly from the upper end of inner sieve 16 to an aperture in the center of the upper wall.

Extending upwardly inside sleeve 11 is a smaller sleeve 21 which carries spaced bearings 22 in which a shaft 23 is rotatably supported on the common axis of sieves 15 and 16 and housing 10.

The space 19 between sleeves 11 and 21 is sealed off from the suspension space in the screening device. Near its upper end shaft 23 extends through wall 20 and is sealed thereto by the sealing means 29. At its extreme upper end, within the chamber 18 defined by lid or cover 17, shaft 23 has a spider fixedly keyed thereto which takes the form of central hub 24, radial spokes 25, and a rim 26 disposed at the top of the annular space 13 between sieves 15 and 16. Cleaning blades 27 connected to rim 26 extend downwardly through the space 13 between sieves 15 and 16 and may have their lower ends interconnected by a support ring 28. This last ring may not be necessary, depending upon the construction of the cleaning blades and the conditions of operation thereof.

The blades 27 are preferably somewhat air foil shaped in transverse cross section and are inclined inwardly at their leading ends and have their trailing ends running relatively close to the inner surface of outer sieve 15. When the shaft 23 is rotated in a counterclockwise direction, as viewed in FIGURE 2, the cleaning blades 27 develop an hydrodynamic effect inside sieve 15 directed radially outwardly so as to dislodge from the outer surface of sieve 15 the impurities and particles of foreign matter or the like that have accumulated thereon and likewise dislodging any clumps of fibers that may have deposited on the sieve.

The heavier portions of the foreign material or impurities thus dislodged from screen 15 tend to migrate toward the bottom of inlet chamber 12 from which they flow out of the screening device via the lower discharge outlet 32. This outlet is preferably tangentially directed so that the rotating motion of the stock in inlet chamber 12 facilitates in washing the heavier particles out of the inlet chamber.

The dislodged impurities which are of a lower specific gravity than the stock being purified migrate toward the upper end of inlet chamber 12 and are withdrawn therefrom via upper discharge outlet 33 as previously described. As in connection with lower discharge outlet 32, the circular motion of the stock in inlet chamber 12 assists in the movement of the lightweight impurities into and through discharge outlet 33.

As will be seen in FIGURE 2, discharge, or rejects, outlet 30 is circumferentially spaced from outlets 32 and 33 and is directed in the opposite tangential direction so that there can be continuous flow of stock around the inlet chamber 12 with a portion thereof being withdrawn through discharge outlets 32 and 33 together with foreign material that is separated out from the stock, either by being removed therefrom at the surface of sieve 15, or which impurities have migrated either to the top or the bottom of inlet chamber due to the specific gravity of the impurities.

In actual practice it has been observed that the withdrawing of the lightweight fraction of the impurities through upper discharge connection 33 is accompanied by the removal of such impurities as wood slivers and tiny particles of dirt and the like which might otherwise either get into the finished paper web or tend to interfere with the flow of stock through the sieve.

It will be noted that both of the discharge outlets 32 and 33 communicate with the outermost periphery of portion 10' of housing 10 so that any impurities tending to separate from the paper stock due to centrifugal action will be conveyed directly into the said discharge openings.

In connection with the operation of the upper discharge outlet 36, as will be seen in FIGURE 3, there may be provided a guiding wall portion 36 positioned on the downstream side and operable for directing the lightweight impurities directly into the discharge outlet. The provision of wall 36 prevents any of the lightweight particles at the level of discharge outlet 33 from passing thereby, and instead, all of the particles of this nature in the uppermost portion of inlet chamber 12 are quickly and efficiently withdrawn therefrom.

The stock, or suspension, which reaches the inside of screen 15 may contain certain kinds of impurities. Impurities to be found in the stock, or suspension, as it comes to the separator may be of various shapes such as granular, spherical, cubical, or elongated particles and likewise particles in the form of substantially two dimensional particles. When the stock is of such a nature that it contains a great many types of impurities, the inner screen 16 is of considerable assistance in obtaining highly purified stock. Ordinarily, when two concentric screens are e employed, one may have slit-like openings therein so that it will tend to retain the three dimensional particles such as spherical or granular or cubical shaped particles whereas the other sieve is provided with round holes and tends to screen out the elongated foreign bodies and those which are substantially two dimensional. The two screens or sieves arranged in series thus compliment each other and provide for a greatly improved end product.

The annular space 13 between sieves 15 and 16 opens upwardly into chamber 18 and at the bottom communicates with a rejects outlet 34. As the rejects removed via discharge 34 contain a rather high percentage of good fibers, they may be used for a lower grade of paper, or they may be returned to the inlet of the screening device for further purification, or they may be conducted together with the rejects removed via discharge 32 and 33 to a second stage screening device.

When two screens or sieves arranged in concentric relation, one set of cleaning blades may be provided operating on the inside of the outer screen and on the outside of the inner screen, or separate blades may be provided for the separate sieves.

The discharge, or rejects, outlet 34 may, if desired, also be tangentially arranged because the rotating cleaning blades 27 will cause rotary motion of the stock in chamber 13 located between the sieves.

Since some air will separate from the stock passing through the screening device and rise upwardly, what does not escape through rejects outlet 33 can be drawn off from chamber 18 via a deaeration line 35 connected to lid or cover 17. Some of the lightweight impurities which might pass through sieve 15 and find their way into chamber 18 can also be drawn off via connection 35.

It will be appreciated that outer screen 15 is sealed at its top and bottom to housing 10 so that inlet chamber 12 is closed and can operate under pressure. Similarly, inner sieve 16 is sealed at its bottom to housing 10 and at its top to upper wall 20 so that the entire separator assembly is sealed and can operate under pressure if so desired.

FIGURES 4 and 5 show a modification of the upper outlet connection for lightweight impurities wherein the outlet connection in the form of conduit 43 leads radially from jacket 10' of housing 10 and has a radial guiding wall portion 46 extending inwardly to the surface of outer screen 15. The modification of FIGURES 4 and 5 makes for a simple construction because guiding wall 46 can form a partial extension of the conduit from which the outlet connection is made and a simple circular hole in jacket 10' will permit mounting of the discharge connection on the screening device.

The upper and lower discharge connection, 32 and 33, are referred to in the appended claims as "rejects outlets."

What is claimed is:

1. A screening device for the screening of fiber suspensions, especially suspensions of fiber in water in the form of paper stock prepared from waste paper and comprising; a substantially cylindrical housing having its axis vertical and closed at the top and bottom, rotationally symmetrical sieve means concentrically arranged in said housing and including at least a first sieve sealed at the upper and lower ends thereof to said housing and radially spaced from the cylindrical wall of the housing so as to define an annular inlet chamber for suspension to be purified, an inlet opening into said inlet chamber for the supply of suspension thereto, a suspension outlet for purified suspension communicating with said housing inside said sieve means, cleaning blade means rotatable in said housing and following a path closely adjacent one surface of at least said first sieve for dislodging impurities collected on the outer surface thereof, and a rejects outlet leading from said inlet chamber near the top thereof for conducting impurities from said inlet chamber which tend to rise toward the top of said inlet chamber.

2. A device according to claim 1, in which said inlet opens into said inlet chamber in a tangential direction whereby the suspension supplied to the inlet chamber moves circumferentially therein.

3. A device according to claim 2, in which a guiding wall is provided in the inlet chamber on the downstream side of said rejects outlet with respect to said circumferential movement of the suspension and operable for guiding material into said outlet.

4. A device according to claim 3, in which said guiding wall extends from the outer surface of said sieve means to the cylindrical wall of the housing.

5. A device according to claim 4, in which said rejects outlet extends tangentially from said inlet chamber in the direction of said circumferential movement of the suspension in said inlet chamber.

6. A device according to claim 4, in which said rejects outlet extends radially from said inlet chamber.

7. A device according to claim 2, which includes a second rejects outlet leading from said inlet chamber near the bottom thereof for conducting impurities therefrom which tend to fall toward the bottom of said inlet chamber.

8. A device according to claim 7, in which said second rejects outlet leads therefrom tangentially in the direction of said circumferential movement of suspension in said inlet chamber.

9. A device according to claim 1, in which said sieve means includes a second sieve smaller than said first sieve and arranged concentrically therewith, said suspension outlet communicating with the region inside said second sieve, and a further rejects outlet leading from said housing and communicating with the space between said first and second sieves near the bottom thereof.

10. A device according to claim 7, in which both the first mentioned rejects outlet near the top of said inlet chamber and the second rejects outlet near the bottom of said inlet chamber open therefrom tangentially in the direction of said circumferential movement of suspension in said inlet chamber and are positioned respectively at the extreme top of said inlet chamber at the outer periphery thereof and at the extreme bottom of said inlet chamber at the outer periphery thereof.

References Cited

UNITED STATES PATENTS 3,387,708   6/1968   Salomon et al. _____ 209—273

JAMES L. DECESARE, Primary Examiner

U.S. Cl. X.R.

209—306, 379; 210—304, 414